United States Patent [19]

Anthon et al.

[11] Patent Number: 4,884,277
[45] Date of Patent: Nov. 28, 1989

[54] FREQUENCY CONVERSION OF OPTICAL RADIATION

[75] Inventors: Douglas A. Anthon, Wheaton; Donald L. Sipes, Jr., Lisle, both of Ill.

[73] Assignee: Amoco Corporation, Chicago, Ill.

[21] Appl. No.: 207,666

[22] Filed: Jun. 16, 1988

Related U.S. Application Data

[63] Continuation-in-part of Ser. No. 157,741, Feb. 18, 1988.

[51] Int. Cl.⁴ .............................................. H01S 3/10
[52] U.S. Cl. ....................................... 372/22; 372/21; 372/71; 372/75
[58] Field of Search .................... 372/18, 21, 22, 27, 372/69-71, 75, 41; 307/427

[56] References Cited

U.S. PATENT DOCUMENTS 3,735,280  5/1973  Johnston, Jr. .......................... 372/22
4,731,795  3/1988  Clark et al. ............................ 372/22
4,791,631  12/1988 Baumert et al. ....................... 372/22

Primary Examiner—William L. Sikes
Assistant Examiner—B. R. R. Holloway
Attorney, Agent, or Firm—Richard A. Kretchmer; William H. Magidson; Ralph C. Medhurst

[57] ABSTRACT

An intracavity frequency-modified laser of improved amplitude stability is obtained through the use of a plurality of nonlinear optical crystals within the laser cavity. Extremely low noise operation of such a multiple crystal laser is achieved by measuring the noise in its output radiation as a function of the temperature of its optical cavity and maintaining the cavity temperature at a value that results in low noise production during subsequent operation.

36 Claims, 2 Drawing Sheets

FREQUENCY CONVERSION OF OPTICAL RADIATION

CROSS-REFERENCE TO RELATED APPLICATIONS

This application is a continuation-in-part of application Ser. No. 157,741, filed Feb. 18, 1988.

FIELD OF THE INVENTION

This invention relates to the conversion of optical radiation of one frequency into optical radiation of another frequency by interaction with nonlinear optical material within an optical cavity. More particularly, it relates to the use of at least two crystals of nonlinear optical material in such a process.

BACKGROUND OF THE INVENTION

A laser is a device which has the ability to produce monochromatic, coherent light through the stimulated emission of photons from atoms, molecules or ions of an active medium which have typically been excited from a ground state to a higher energy level by an input of energy. Such a device contains an optical cavity or resonator which is defined by highly reflecting surfaces which form a closed round trip path for light, and the active medium is contained within the optical cavity.

If a population inversion is created by excitation of the active medium, the spontaneous emission of a photon from an excited atom, molecule or ion undergoing transition to a lower energy state can stimulate the emission of photons of substantially identical energy from other excited atoms, molecules or ions. As a consequence, the initial photon creates a cascade of photons between the reflecting surfaces of the optical cavity which are of substantially identical energy and exactly in phase. A portion of this cascade of photons is then discharged out of the optical cavity, for example, by transmission through one or more of the reflecting surfaces of the cavity. These discharged photons constitute the laser output.

Excitation of the active medium of a laser can be accomplished by a variety of methods. However, the most common methods are optical pumping, use of an electrical discharge, and the passage of an electric current through the p-n junction of a semiconductor laser.

Semiconductor lasers contain a p-n junction which forms a diode, and this junction functions as the active medium of the laser. Such devices, which are also referred to as laser diodes, are typically constructed from materials such as gallium arsenide and aluminum gallium arsenide alloys. The efficiency of such lasers in converting electrical power to output radiation is relatively high and, for example, can be in excess of 40 percent.

The use of flashlamps, light-emitting diodes (as used herein, this term includes superluminescent diodes and superluminescent diode arrays) and laser diodes (as used herein, this term includes laser diode arrays) to optically pump or excite a solid lasant material is wellknown. Lasant materials commonly used in such solid state lasers include crystalline or glassy host materials into which an active material, such as trivalent neodymium ions, is incorporated. Detailed summaries of conventional crystalline lasant materials are set forth in the *CRC Handbook of Laser Science and Technology*, Vol. I, M. J. Weber, Ed., CRC Press, Inc., Boca Raton, Fla., 1982, pp. 72-135 and in *Laser Crystals*, Vol. 14 of the Springer Series in Optical Sciences, D. L. MacAdam, Ed., Springer-Verlag, New York, N.Y., 1981. Conventional host materials for neodymium ions include glass, yttrium aluminum garnet ($Y_3Al_5O_{12}$, referred to as YAG), $YAlO_3$ (referred to as YALO), $LiYF_4$ (referred to as YLF), and gadolinium scandium gallium garnet ($Gd_3Sc_2Ga_3O_{12}$) referred to as GSGG. By way of example, when neodymium-doped YAG is employed as the lasant material in an optically pumped solid state laser, it can be pumped by absorption of light having a wavelength of about 808 nm and can emit light having a wavelength of 1064 nm.

U.S. Pat. No. 3,624,545 issued to Ross on Nov. 30, 1971, describes an optically pumped solid state laser composed of a YAG rod which is side-pumped by at least one semiconductor laser diode. Similarly, U.S. Pat. No. 3,753,145 issued to Chesler on Aug. 14, 1973, discloses the use of one or more light-emitting semiconductor diodes to end pump a neodymium-doped YAG rod. The use of an array of pulsed laser diodes to end pump a solid lasant material such as neodymium-doped YAG is described in U.S. Pat. No. 3,982,201 issued to Rosenkrantz et al. on Sept. 21, 1976. Finally, D. L. Sipes, *Appl. Phys. Lett.*, Vol. 47, No. 2, 1985, pp. 74-75, has reported that the use of a tightly focused semiconductor laser diode array to end pump a neodymium-doped YAG results in a high efficiency conversion of pumping radiation having a wavelength of 810 nm to output radiation having a wavelength of 1064 nm.

Materials having nonlinear optical properties are well-known. For example, U.S. Pat. No. 3,949,323 issued to Bierlein et al. on Apr. 6, 1976, discloses that nonlinear optical properties are possessed by materials having the formula $MTiO(XO_4)$ where M is at least one of K, Rb, Tl and $NH_4$; and X is at least one of P or As, except when $NH_4$ is present, then X is only P. This generic formula includes potassium titanyl phosphate, $KTiOPO_4$, a particularly useful nonlinear material. Other known nonlinear optical materials include, but are not limited to, $KH_2PO_4$, $LiNbO_3$, $KNbO_3$, $\beta$-$BaB_2O_4$, $Ba_2NaNb_5O_{15}$, $LiIO_3$, $HIO_3$, $KB_5O_8\cdot 4H_2O$, potassium lithium niobate and urea. A review of the nonlinear optical properties of a number of different uniaxial crystals has been published in *Sov. J. Quantum Electron.*, Vol. 7, No. 1, Jan. 1977, pp. 1-13. Nonlinear optical materials have also been reviewed by S. Singh in the *CRC Handbook of Laser Science and Technology*, Vol. III, M. J. Weber, Ed., CRC Press, Inc., Boca Raton, Fla., 1986, pp. 3-228.

The conversion of optical radiation of one frequency to optical radiation of another frequency through interaction with a nonlinear optical material is well-known and has been extensively studied. Examples of such conversion include harmonic generation, optical mixing and parametric oscillation. Second-harmonic generation or "frequency doubling" is perhaps the most common and important example of nonlinear optics wherein part of the energy of an optical wave of angular frequency $\omega$ propagating through a nonlinear optical crystal is converted to energy of a wave of angular frequency $2\omega$. Second-harmonic generation has been reviewed by A. Yariv in *Quantum Electronics*, Second Ed., John Wiley & Sons, N.Y., 1975 at pages 407-434 and by W. Koechner in *Solid State Laser Engineering*, Springer-Verlag, N.Y., 1976 at pages 491-524.

Electromagnetic waves having a frequency in the optical range and propagating through a nonlinear crystal induce polarization waves which have frequencies equal to the sum and difference of those of the exciting waves. Such a polarization wave can transfer energy to an electromagnetic wave of the same frequency. The efficiency of energy transfer from a polarization wave to the corresponding electromagnetic wave is a function of: (a) the magnitude of the second order polarizability tensor, since this tensor element determines the amplitude of the polarization wave, and (b) the distance over which the polarization wave and the radiated electromagnetic wave can remain sufficiently in phase.

The coherence length, $l_c$, is a measure of the phase relationship between the polarization wave and the radiated wave which is given by the following relationship:

$$l_c = \pi / \Delta k$$

where $\Delta k$ is the difference between the wave vectors of the polarization and electromagnetic waves. More specifically, the coherence length is the distance from the entrance surface of the nonlinear optical crystal to the point at which the power of the radiated electromagnetic wave will be at its maximum value. Phase-matching occurs when $\Delta k = 0$. The condition $\Delta k = 0$ can also be expressed as $n_3\omega_3 = n_1\omega_1 \pm n_2\omega_2$ where $\omega_3 = \omega_1\omega_2$; $\omega_1$ and $\omega_2$ are the frequencies of the input electromagnetic waves; $\omega_3$ is the frequency of the radiated electromagnetic wave; and $n_1$, $n_2$ and $n_3$ are the refractive indicies of the respective waves in the nonlinear optical crystal. In the special case of second harmonic generation, there is incident radiation of only one frequency, $\omega$, so that $\omega_1 = \omega_2 = \omega$ and $\omega_3 = 2\omega$.

For appreciable conversion of optical radiation of one frequency to optical radiation of another frequency in a nonlinear optical crystal, the interacting waves must stay substantially in phase throughout the crystal so that:

$$|\Delta k| = |k_3 - k_1 - k_2| < 2\zeta/l$$

where $k_1$, $k_2$ and $k_3$ represent the wave numbers corresponding to radiation of frequencies $\omega_1$, $\omega_2$ and $\omega_3$, respectively, and l is the interaction length in the nonlinear material. The term "substantially phase-matched," as used herein, means that $|\Delta k| < 2\pi/l$ for a given nonlinear optical crystal.

A conventional method for achieving phase-matching in a nonlinear optical material utilizes the fact that dispersion (the change of refractive index with frequency) can be offset by using the natural birefringence of uniaxial or biaxial crystals. Such crystals have two refractive indicies for a given direction of propagation which correspond to the two allowed orthogonally polarized propagation modes. Accordingly, by an appropriate choice of polarization and direction of propagation, it is often possible to achieve phase-matching in a birefringent non-linear optical crystal. The term "phase-match axis," as used herein, refers to a line or direction through a non-linear optical crystal along which the substantially phase-matched conversion of a stated input radiation into a stated output radiation is permitted for at least certain polarizations of said input radiation.

Phase-matching is generally of either Type I or Type II. Type I phase-matching requires that the incident waves interacting in the nonlinear optical material have the same polarization. Type II phase-matching requires that the incident waves interacting in the nonlinear optical material have orthogonal polarizations.

Second harmonic generation within the cavity of a multilongitudinal mode laser by an intracavity doubling crystal has recently been analyzed by T. Baer, *J. Opt. Soc. Am. B*, Vol. 3, No. 9, pp. 1175–1180 (1986). This report sets forth an experimental and theoretical evaluation of the output of a Nd:YAG laser which is pumped by a laser diode array and contains an intracavity doubling crystal. It is reported that large amplitude fluctuations and longitudinal mode instabilities result when the doubling crystal is inserted into the laser cavity. However, it is also reported that these instabilities disappear when the laser is restricted to a single oscillating mode by an intracavity etalon. A detailed theoretical analysis of a multilongitudinal mode intracavity-doubled laser has been reported by X. G. Wu et al., *J. Opt. Soc. Am. B*, Vol. 4, No. 11, pp. 1870–1877 (1987).

U.S. Pat. Nos. 4,656,635 (Apr. 7, 1987) and 4,701,929 (Oct. 20, 1987), both issued to Baer et al., disclose a laser diode pumped, intracavity frequency-doubled, solid state laser. In these patents, it is stated that a problem with such devices is the generation of amplitude noise, including large amplitude spikes, which prevent or limit use in applications requiring a highly stable or constant output. It is further stated that this noise results from the combination of multiple longitudinal modes. However, it is disclosed that such noise can be reduced or eliminated by inserting an etalon into the laser cavity and thereby forcing the laser to operate in a single mode. It is also disclosed that it may be possible to reduce this noise by mode locking the laser.

U.S. Pat. No. 3,619,637, issued to Goto et al. on Nov. 9, 1971, discloses a harmonic generator which comprises at least two nonlinear dielectric crystals where: (a) the input and output surfaces of the crystals are parallel to each other; (b) the crystals are phase-matched for the conversion of input radiation to a harmonic; (c) input radiation is directed into the crystals perpendicular to the input surfaces; (d) the crystals are disposed in cascade; and (e) the optical axes of adjacent crystals, as projected on their input surfaces, intersect each other at right angles. It is further disclosed that such a device results in the efficient generation of harmonic radiation irrespective of the orientation of the plane of polarization of the input radiation. Similarly, U.S. Pat. No. 4,510,402, issued to Summers et al. on Apr. 9, 1985, is directed to an optical harmonic generator which contains a serially arranged pair of uniaxial birefringent crystals which can be positioned for either second or third harmonic generation. However, neither of these patents contains any suggestion that multiple nonlinear optical crystals could be inserted within the optical cavity of a laser.

SUMMARY OF THE INVENTION

The present invention is directed to a method for reducing or eliminating the amplitude noise that can appear in the output of a laser upon the insertion of a nonlinear optical crystal into the laser cavity. Such noise is highly undesirable if the output radiation of such a laser is to be used in applications such as optical storage of data, spectroscopy, communications, projection displays, laser printing and laser film read/write systems.

One embodiment of the invention is a method for frequency-doubling a laser which comprises: (a) frequency doubling the radiation of said laser within the optical cavity of the laser with nonlinear optical means comprising at least two nonlinear optical crystals which are oriented so that said laser radiation interacts with said crystals along a phase-match axis of each crystal for frequency-doubling said laser radiation; (b) measuring the noise in the frequency-doubled output radiation from said laser as a function of the temperature of said optical cavity; (c) determining a temperature range for said optical cavity over which said output radiation is relatively noise-free; and (d) maintaining the temperature of said laser cavity at a value which is within said temperature range during subsequent operation of the laser.

Another embodiment of the invention is a method for generating coherent optical radiation which comprises: (a) generating optical pumping radiation from optical pumping means which is selected from the group consisting of laser diodes and light-emitting diodes; (b) generating optical radiation of a first frequency within an optical cavity for said radiation of a first frequency by optically pumping a solid lasant material within said optical cavity; (c) converting said radiation of a first frequency into optical radiation of a second frequency within said optical cavity with nonlinear optical means comprising at least two nonlinear optical crystals which are oriented so that radiation of said first frequency interacts with said crystals along a phase-match axis of each crystal for said radiation of a first and second frequency; (d) withdrawing said optical radiation of a second frequency from said optical cavity as output radiation; (e) measuring the noise in said output radiation as a function of the temperature of said optical cavity; (f) determining a temperature range for said optical cavity over which said output radiation is relatively noise-free; and (g) maintaining the temperature of said laser cavity at a value which is within said temperature range during subsequent production of said output radiation.

An object of the invention is to provide a laser of improved amplitude stability which is frequency modified by intracavity nonlinear optical means.

Another object of the invention is to provide a multilongitudinal-mode, optically-pumped, intracavity-doubled solid state laser of improved amplitude stability.

Another object of the invention is to provide a diode-pumped, intracavity-doubled, multilongitudinal-mode, solid state laser of improved output stability.

A further object of the invention is to provide a method for reducing the amplitude instabilities that are observed in the output of a laser when a nonlinear optical material is inserted into the laser cavity.

A still further object of the invention is to provide a method for improving the amplitude stability of an intracavity frequency-doubled laser.

DETAILED DESCRIPTION OF THE PREFERRED EMBODIMENTS

Figure 1:
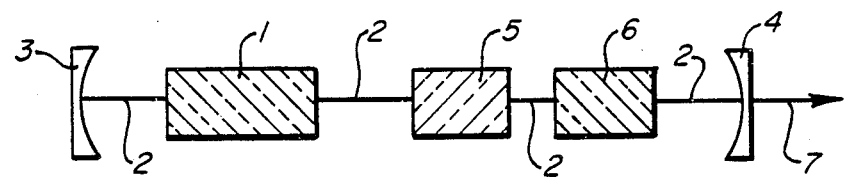
FIG. 1 of the drawings is a schematic representation of one embodiment of the invention.
Figure 3:
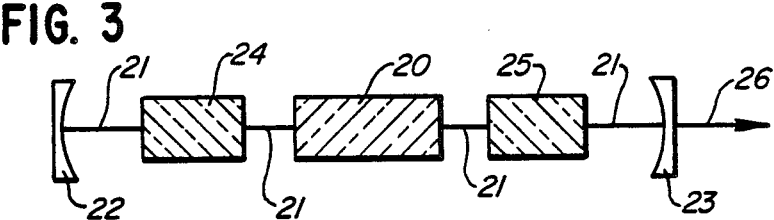
FIG. 3 of the drawings is a schematic representation of a second embodiment of the invention.
Figure 4:
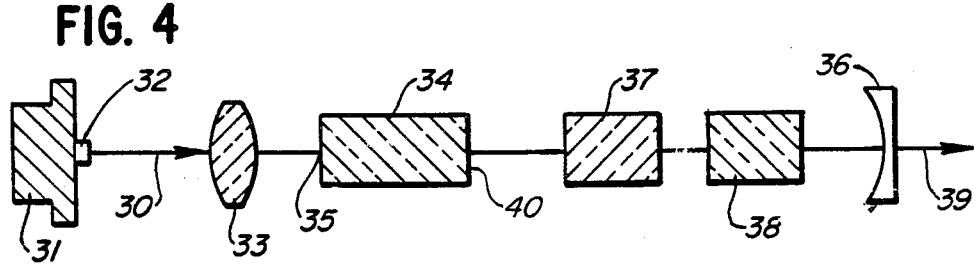
FIG. 4 of the drawings is a schematic representation of a third embodiment of the invention.

While this invention is susceptible of embodiment in many forms, there are schematically shown in FIGS. 1, 3 and 4 three specific embodiments, with the understanding that the present disclosure is not intended to limit the invention to the embodiments illustrated.

With reference to FIG. 1, lasant material 1 emits laser light (hereinafter referred to as cavity radiation) in response to excitation by excitation means which is not shown in the drawing. The cavity radiation is then circulated along a path 2 within the optical cavity defined by mirrors 3 and 4. Nonlinear optical crystals 5 and 6 are positioned within the optical cavity in such a manner that the cavity radiation can interact with each crystal along a phase-match axis for the conversion of cavity radiation into radiation which is a harmonic thereof. Harmonic radiation is generated upon interaction of the cavity radiation with the nonlinear optical crystals 5 and 6 and is passed through mirror 4 as output radiation 7.

Lasant material 1 can be any conventional material which is capable of producing laser light upon excitation by a suitable source of energy. It will be appreciated that the lasant material 1 can exist in either a gas, liquid or solid state as, for example, in an excimer laser (gas), a dye laser (liquid) or a neodymium-doped YAG laser (solid). The radiation produced by the lasing of lasant material 1 can be either polarized or substantially unpolarized.

Mirrors 3 and 4 are highly reflecting for the cavity radiation produced by the lasing of lasant material 1. In addition, mirror 3 is preferably highly reflecting for the frequency-modified output radiation 7 while mirror 4 is highly transmitting for output radiation 7.

Cavity radiation circulating within the optical cavity defined by mirrors 3 and 4 is directed into nonlinear optical crystals 5 and 6 along a phase-match axis of each crystal that permits the efficient conversion of cavity radiation to the desired harmonic. The two nonlinear optical crystals 5 and 6 can be either of the same chemical composition or of a different chemical composition. For example, crystals 5 and 6 can both consist of potassium titanyl phosphate or, in the alternative, one crystal can consist of potassium titanyl phosphate while the other crystal consists of any other suitable nonlinear optical material.

When a beam of coherent radiation is allowed to interact with a single nonlinear optical crystal along a phase-match axis with the crystal having a fixed orientation about that axis, certain polarizations of the input beam will not interact with the crystal to yield frequency-modified output radiation. In the practice of this invention, two or more nonlinear optical crystals (only two such crystals, 5 and 6, are shown in FIG. 1) are allowed to interact with the cavity radiation. Preferably, the orientation of these crystals with respect to each other about the selected phase-match axis is adjusted so that frequency-modified output radiation 7 is generated from all possible polarizations of the cavity radiation circulating within the optical cavity. A preferred embodiment of the invention involves adjusting the orientation of the crystals with respect to each other about the selected phase-match axis to maximize the production of output radiation 7 and minimize amplitude fluctuations in the output radiation 7 which is discharged from the device.

When the nonlinear optical crystals of this invention are of the same composition, they desirably have a different crystallographic orientation with respect to each other. Accordingly, cavity radiation of a given polarization will interact with each crystal in a different manner, thereby ensuring that frequency modified output radiation 7 will be generated from that input radiation. In one embodiment of the two crystal device illustrated by FIG. 1, crystals 5 and 6 can both be composed of potassium titanyl phosphate which belongs to the orthorhombic point group mm2 (space group Pna2$_1$) which lacks a center of symmetry. These crystals can be phase-matched for the conversion of cavity radiation having a wavelength of 1064 nm to its second harmonic which has a wavelength of 532 nm. For this frequency conversion, the potassium titanyl phosphate crystals can be oriented for a Type II interaction with the cavity radiation propagating along a phase-match axis within the crystallographic xy-plane, 24±2° off the crystallographic x-axis and perpendicular to the crystallographic z-axis. If this same phase-match axis of each crystal is used, the crystallographic z-axis of one crystal will desirably be at an angle about this axis with respect to the z-axis of the second crystal. This angle can be any of the various possibilities. However, an angle in the range from about 30° to about 70° is believed to be particularly satisfactory.

Figure 2:
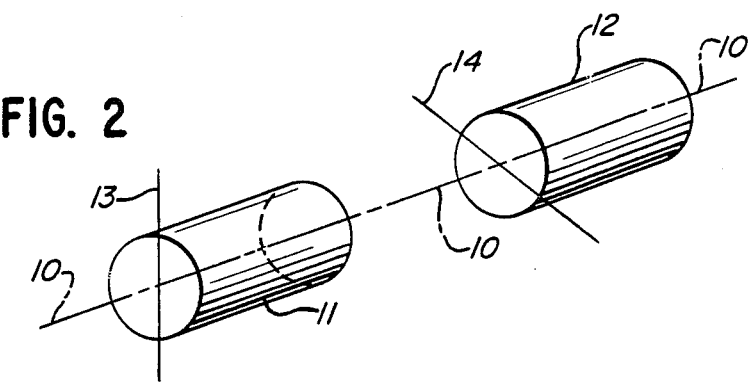
FIG. 2 of the drawings is a perspective view of two components of the embodiment illustrated in FIG. 1.

The above-described embodiment involving the use of two crystals of potassium titanyl phosphate which are phase-matched for the conversion of 1064 nm wavelength cavity radiation to 532 nm wavelength output radiation is illustrated by FIG. 2 where the propagation of cavity radiation is along line 10 and the phase-match axis of potassium titanyl phosphate crystals 11 and 12 is also along line 10. The orientation of the crystallographic z-axis of crystal 11 with respect to line 10 is indicated by line 13, and the orientation of the crystallographic z-axis of crystal 12 with respect to line 10 is indicated by line 14. The plane defined by lines 10 and 13 and the plane defined by lines 10 and 14 form an angle with respect to each other, for example, of about 60°.

It will be appreciated, of course, that more than two nonlinear optical crystals can be used in the practice of this invention. For example, three or four crystals can be used which are desirably oriented with respect to each other in such a manner that the desired frequency-modified output radiation is generated for all possible polarizations of the circulating cavity radiation.

The geometric shape of the nonlinear optical crystals used in the practice of this invention can vary widely. For example, the crystals can be rod shaped, as illustrated in FIG. 2, or rhombohedral in shape, and the crystals can have lens-shaped surfaces if desired. It will also be appreciated that the nonlinear optical crystals can have heating means associated with them to control the temperature of the crystals and thereby optimize the phase-matching. For example, each crystal can have a separate and independently controlled heating means associated with it. When possible, noncritical phase-matching is usually preferred in order to minimize the effects of beam divergence and "walk-off."

Potassium titanyl phosphate, KTiOPO$_4$, is a highly preferred nonlinear optical material. However, it will be appreciated that any nonlinear optical material can be utilized in the practice of this invention. Suitable nonlinear optical materials include, but are not limited to, KH$_2$PO$_4$, LiNbO$_3$, KNbO$_3$, $\beta$-BaB$_2$O$_4$, Ba$_2$NaNb$_5$O$_{15}$, LiIO$_3$, HIO$_3$, KB$_5$O$_8$·4H$_2$O, potassium lithium niobate, urea and compounds of the formula MTiO(XO$_4$) where M is selected from the group consisting of K, Rb and Tl, and X is selected from the group consisting of P and As.

As noted above, it has been observed that large amplitude fluctuations and longitudinal-mode instabilities are introduced into the output of a neodymium-doped YAG laser when a nonlinear optical crystal is inserted into the laser cavity to frequency-double the laser's output radiation. We have found that these instabilities can be reduced or eliminated through the use of a plurality of nonlinear optical crystals in accordance with this invention.

In a highly preferred embodiment of the invention, the laser illustrated by FIG. 1 is additionally provided with temperature control means for adjusting and controlling the temperature of the laser's optical cavity and its contents. This temperature control means should be effective to maintain the optical cavity at a substantially constant temperature. The temperature control means can be of any conventional type, for example, an electrically powered resistance heater or thermoelectric device. Through the use of such temperature control means, the temperature of the cavity and its contents are desirably maintained at ±1° C. of the selected value, preferably at ±0.5° C. of the selected value and more preferably at ±0.1° C. of the selected value. By maintaining the optical cavity and its contents at a substantially constant temperature, it is possible to further stabilize the amplitude of output radiation 7.

The random fluctuations in the amplitude of output radiation 7, for example, within a frequency range of about 1 kHz to about 50 MHz, are referred to as noise and are conveniently measured as percent root mean square (% RMS) noise. Although an intracavity frequency-modified laser of improved amplitude stability is obtained through the simple use of a plurality of nonlinear optical crystals 5 and 6 within the laser cavity, we have also found that the noise content of output radiation 7 drops essentially to zero over certain temperature ranges. More specifically, if the noise content of output radiation 7 is measured as a function of the temperature of the laser cavity, certain ranges of temperature or "temperature windows" are observed over which the noise drops to essentially zero. The width of these windows and the precise temperatures at which they occur are different for each individual laser. That is to say, even if a substantial effort is made to construct two completely identical lasers, we have found that they will be sufficiently different, that the noise content of output radiation 7 as a function of the temperature of the laser cavity will be a unique characteristic of each device. However, for a given laser, the noise content of the output radiation 7 as a function of temperature does not change significantly over a period of months or with repeated cycling over large temperature ranges. Accordingly, a highly preferred embodiment of this invention comprises locating a window of substantially noise-free operation for a laser by measuring the noise content of output radiation 7 as a function of the temperature of the optical cavity and maintaining the temperature of the laser cavity at a value within such a window during subsequent operation. These windows of substantially noise-free operation are typically from about 0.5° to about 5° C. wide, and within such a window the % RMS noise will typically be less than about 5% and frequently less than about 1%. The windows of substantially noise-free operation are easily identified by measuring the noise content of output radiation 7 over any range of temperatures which is convenient from an operating point of view, for example, from about 0° to about 100° C., or more conveniently, from about 30° to about 65° C. This measurement should be carried out over a range of at least about 5° C. and preferably over a range of at least about 10° or 20° C. in order to give a reasonable sampling of the laser's temperature-related performance.

FIG. 3 schematically illustrates a second embodiment of the invention which is identical with that of FIG. 1 except for the placement of the nonlinear optical crystals. With reference to FIG. 3, lasant material 20 emits laser light (hereinafter referred to as cavity radiation) in response to excitation by excitation means which is not shown. The cavity radiation is then circulated along a path 21 within the optical cavity which is defined by mirrors 22 and 23. Nonlinear optical crystals 24 and 25 are positioned within the optical cavity in such a manner that the cavity radiation can interact with each crystal along a phase-match axis for the conversion of cavity radiation into radiation which is a harmonic thereof. The nature and orientation of crystals 24 and 25 is the same as described for crystals 5 and 6 of FIG. 1. Harmonic radiation is generated upon interaction of the cavity radiation with the nonlinear optical crystals 24 and 25 and is passed through mirror 23 as output radiation 26.

FIG. 4 schematically illustrates a third embodiment of the invention wherein two nonlinear optical crystals are contained within the optical cavity of an optically pumped solid state laser. With reference to FIG. 4, optical pumping radiation 30 from optical pumping means 31 and 32 is focused by focusing means 33 onto solid lasant material 34 which has a suitable reflective coating on surface 35 and is capable of being pumped by the radiation from said pumping means (31 and 32). Light emitted by the lasing of lasant material 34 is contained within the optical cavity defined by the reflective coating on surface 35 and mirror 36 and is hereinafter referred to as cavity radiation. Nonlinear optical crystals 37 and 38 are positioned within the optical cavity in such a manner that cavity radiation circulating within the optical cavity can interact with each crystal along a phase-match axis for the conversion of cavity radiation into radiation which is a harmonic thereof. The nature and orientation of crystals 37 and 38 is the same as described for crystals 5 and 6 of FIG. 1. Harmonic radiation is generated upon interaction of the cavity radiation with nonlinear optical crystals 37 and 38 and is passed through mirror 36 as output radiation 39.

Optical pumping means 31 and 32 can comprise any conventional source of optical pumping radiation. Suitable sources include, but are not limited to, flashlamps and lasers. However, preferred sources of pumping radiation 30 consist of light-emitting diodes and laser diodes. Such diodes are commonly attached to a heat-resistant and thermally conductive heat sink and are packaged in a metal housing. For efficient operation, the pumping radiation 30 is matched with a suitable absorption band of the lasant material 34. Conventional light-emitting diodes and laser diodes are available which produce output radiation having a wavelength over the range from about 630 nm to about 1600 nm, and any such device producing pumping radiation 30 of a wavelength effective to pump lasant material 34 can be used in the practice of this invention. For example, AlGaInP/GaInP devices can be used to provide radiation in the wavelength range from about 630 nm to about 700 nm, GaAlAs devices can be used to provide radiation in the wavelength range from about 750 nm to about 900 nm, and InGaAsP devices can be used to provide radiation in the wavelength range from about 1000 nm to about 1600 nm.

A highly suitable source of optical pumping radiation 30 consists of a gallium aluminum arsenide laser diode array 32, emitting light having a wavelength of about 810 nm, which is attached to heat sink 31. Heat sink 31 can be passive in character. However, heat sink 31 can also comprise a thermoelectric cooler to help maintain laser diode array 32 at a constant temperature and thereby ensure optimal operation of laser diode array 32 at a constant wavelength. It will be appreciated, of course, that during operation the optical pumping means will be attached to a suitable power supply. Electrical leads from laser diode array 32 which are directed to a power supply are not illustrated in FIG. 4.

Focusing means 33 serves to focus pumping radiation 30 onto lasant material 34. This focusing results in a high pumping intensity and an associated high photon to photon conversion efficiency in lasant material 34. Focusing means 33 can comprise any conventional means for focusing light such as a gradient index lens, a ball lens, an aspheric lens or a combination of lenses. It will be appreciated, however, that focusing means 33 is not essential to the practice of this invention, and the use of such focusing means merely represents a preferred embodiment.

Any conventional solid lasant material 34 can be utilized provided that it is capable of being optically pumped by the optical pumping means selected. Suitable lasant materials include, but are not limited to, solids selected from the group consisting of glassy and crystalline host materials which are doped with an active material. Highly suitable active materials include, but are not limited to, ions of chromium, titanium and the rare earth metals. Highly suitable lasant materials include neodymium-doped YAG, neodymium-doped YALO and neodymium-doped YLF. By way of specific example, neodymium-doped YAG is a highly suitable lasant material 34 for use in combination with an optical pumping means which produces light having a wavelength of about 810 nm. When pumped with light of this wavelength, neodymium-doped YAG can emit light having a wavelength of 1064 nm.

The precise geometric shape of lasant material 34 can vary widely. For example, lasant material 34 can be rod-shaped, or rhombohedral in shape if desired, and lens shaped surfaces can be used if desired. For example, a convex input surface can be used in place of the flat surface 35 shown in FIG. 4. Such a convex surface can serve to decrease the resonator sensitivity to misalignment and create an output beam from lasant material 34 which has an optimized beam waist for efficient interaction with non-linear optical crystals 37 and 38. If desired, an end-pumped fiber of lasant material can be used. Highly suitable fibers for this purpose include, but are not limited to, glass optical fibers which are doped with ions of a rare earth metal such as neodymium. The length of such a fiber is easily adjusted to result in absorption of essentially all of the optical pumping radiation 30. If a very long fiber is required, it can be coiled, on a spool for example, in order to minimize the overall length of the laser of this invention.

The reflective coating on surface 35 of lasant material 34 is selected in such a manner that it is substantially transparent to optical pumping radiation 30 but highly reflective with respect to the cavity radiation produced by the lasing of lasant material 34. In a preferred embodiment, this coating will also be highly reflective of the harmonic output radiation 39. High reflectivity of the coating for this harmonic radiation will serve to prevent the pump-side loss of any harmonic radiation which is produced upon the reflection of cavity radiation into nonlinear optical crystals 37 and 38 by mirror 36. Such a coating is conventional in character and can, for example, be a dielectric coating.

Mirror 36 is selected in such a manner that it is highly reflective for the cavity radiation produced by the lasing of lasant material 34 but substantially transparent to output radiation 39 which is generated by the interaction of cavity radiation with nonlinear optical crystals 37 and 38. Mirror 36 is conventional in character and, for example, can comprise any suitable conventional coating on any suitable substrate.

In a highly preferred embodiment, the frequency-modified laser of FIG. 4 is additionally provided with temperature control means for adjusting and controlling the temperature of the laser's optical cavity and its contents. As discussed in connection with the embodiment illustrated by FIG. 1, the use of such temperature control means to hold the cavity and its contents at a substantially constant temperature serves to further reduce the amplitude fluctuations in output radiation 39.

In a specific example of the embodiment illustrated in FIG. 4, neodymium-doped YAG is used as lasant material 34, and the nonlinear optical crystals 37 and 38 are both composed of potassium titanyl phosphate. The neodymium-doped YAG is optically pumped by a multistripe laser diode array 32 which is attached to a thermoelectric cooler 31 (the array and attached thermoelectric cooler is a Model SDL 2422-H1 device manufactured by Spectra Diode Labs of San Jose, Calif.). The laser diode array 32 is a 10-stripe array consisting of 3 micron stripes on 10 micron centers which can provide about 200 mW of pumping radiation 30 having a wavelength of about 810 nm. This pumping radiation 30 is focused into lasant material 34 by a gradient index lens 33 which has a 0.29 pitch. The lasant material 34 contains about 1% neodymium and is in the form of a rod having a 7 mm length and a 3 mm diameter. The lasant material 34 is oriented for low threshold operation at a wavelength of 1064 nm and emits light (cavity radiation) having a wavelength of 1064 nm in response to excitation by the pumping radiation. Input face 35 of lasant material 34 carries a multilayer dielectric coating which is highly reflective (R>99.8%) at a wavelength of 1064 nm and highly transparent (T>80%) at a wavelength of 810 nm. Output face 40 of lasant material 34 carries an antireflection coating (R<0.2%) for light having a wavelength of 1064 nm. Nonlinear optical crystals 37 and 38 are rhombohedral prisms of potassium titanyl phosphate which have dimensions of 1×1×3 mm (with a 3 mm interaction length with the cavity radiation) and are cut for Type II noncritical phase-matched conversion of cavity radiation to its second harmonic having a wavelength of 532 nm. Crystals 37 and 38 are also positioned in such a manner that the crystallographic z-axis of one crystal makes a 45° angle with respect to the crystallographic z-axis of the other crystal about the axis along which they encounter cavity radiation. Further, crystals 37 and 38 are antireflection coated with respect to both 532 nm and 1064 nm wavelength radiation. Output radiation 39 having a frequency of 532 nm is transmitted through mirror 36 which has a radius of curvature of 10 cm and carries a dielectric coating which is highly reflective (R>99.8%) at a wavelength of 1064 nm and highly transparent at a wavelength of 532 nm. The optical cavity of this laser has a length (distance from surface 35 to mirror 36) of about 30 mm.

Figure 5:
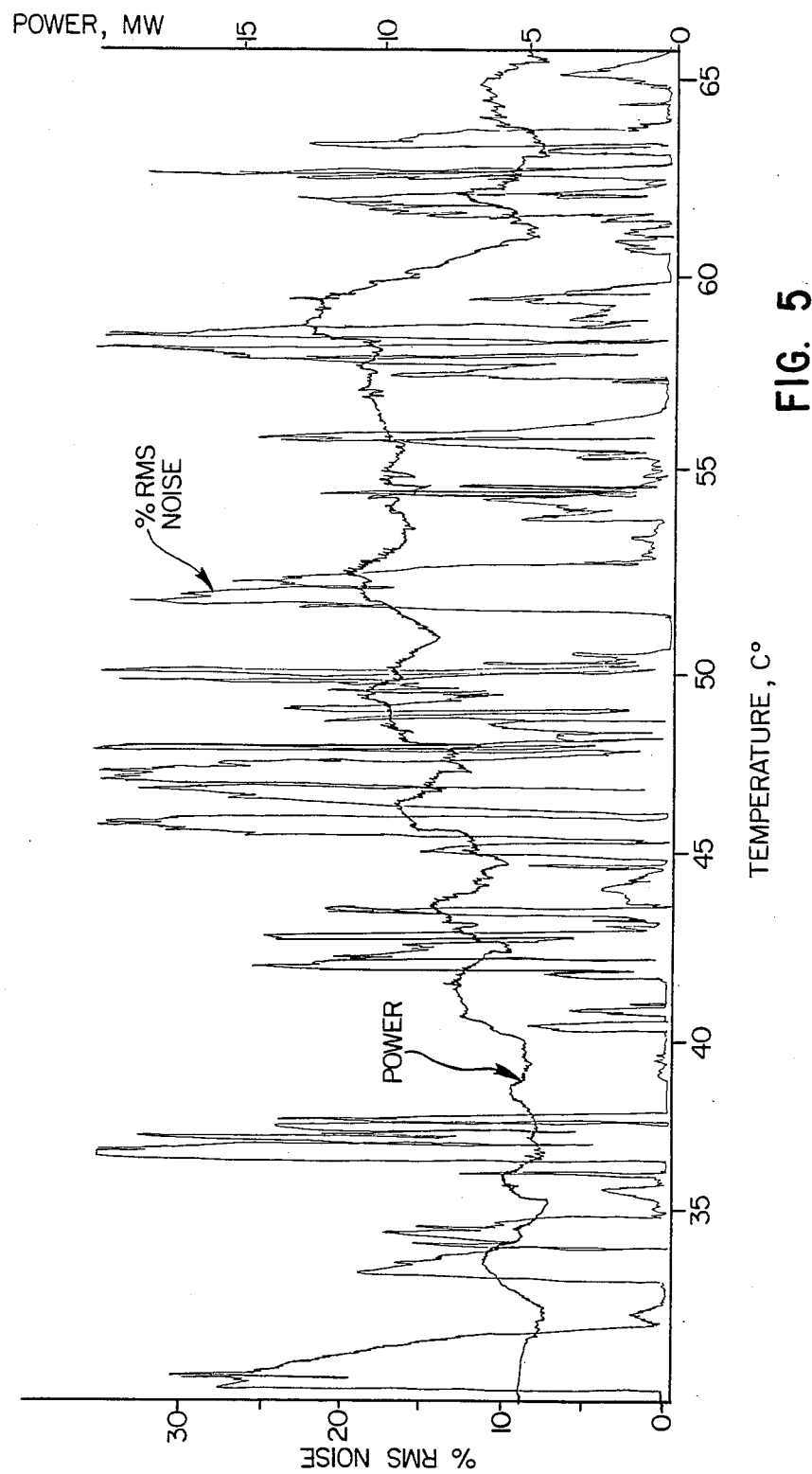
FIG. 5 of the drawings illustrates the optical output power of a frequency-doubled laser diode pumped solid state laser of the type illustrated by FIG. 4 and the root mean square (RMS) noise content of said output as a function of the temperature of the laser cavity.

A series of lasers were constructed as detailed above for the specific example of the laser illustrated in FIG. 4. The power and percent root mean square (RMS) noise of the 532 nm output radiation from each laser in the series was measured as a function of temperature over the range from about 30° to about 70° C. by fitting the optical cavity of each laser within a complementary-shaped copper block which was temperature controlled by means of circulating hot water from a thermostated reservoir. The output power was measured with a Liconix Model 45PM power meter, and the % RMS noise in the output radiation was measured by detecting the radiation with a Photodyne Model 1500XP optical waveform analyzer and evaluating the resulting signal with a Ballantine Model 323 True RMS AC voltmeter. The results for a typical member of this series of lasers over a temperature range from 30° C. to 65° C. (the temperature was measured at the temperature-controlled copper block) are shown in FIG. 5. With reference to FIG. 5, it will be noted that the RMS noise of the device drops to essentially zero over certain ranges of temperature or "temperature windows." For example, such a window occurs at about 37.9–40.3° C. and another appears at about 50.7–51.4° C. Over the range of temperatures examined, each laser in the series had at least one window of substantially noise-free operation which was at least about 0.5° C. wide, and the largest window observed had a width of about 5° C. The precise location and width of these windows of substantially noise-free operation were found to be unique characteristics of each individual laser which did not change significantly with time or repeated temperature cycling over several tens of degrees centigrade. Accordingly, each laser could be made to operate in a substantially noise-free manner by maintaining the optical cavity of the device at a temperature within such a window during operation.

We claim:

1. A method for frequency-doubling a laser which comprises:
   (a) converting the radiation of said laser into frequency-doubled radiation within the optical cavity of the laser with nonlinear optical means comprising at least two nonlinear optical crystals which are oriented so that said laser radiation interacts with said crystals along a phase-match axis of each crystal for frequency-doubling said laser radiation;
   (b) withdrawing said frequency-doubled radiation from the optical cavity as output radiation; and
   (c) maintaining the temperature of said optical cavity within a range over which said output radiation is substantially noise-free.

2. The method of claim 1 which additionally comprises orienting said crystals about said axis so that frequency-doubled radiation is generated from all possible polarizations of said laser radiation.

3. The method of claim 1 wherein said crystals are of the same composition and have a different crystallographic orientation with respect to each other.

4. A method for generating coherent optical radiation which comprises:
   (a) generating optical pumping radiation from optical pumping means which is selected from the group consisting of laser diodes and light-emitting diodes;
   (b) generating optical radiation of a first frequency within an optical cavity for said radiation of a first frequency by optically pumping a solid lasant material within said optical cavity;
   (c) converting said radiation of a first frequency into optical radiation of a second frequency within said optical cavity with nonlinear optical means comprising at least two nonlinear optical crystals which are oriented so that radiation of said first frequency interacts with said crystals along a phase-match axis of each crystal of said radiation of a first and second frequency;
   (d) withdrawing said optical radiation of a second frequency from said optical cavity as output radiation; and
   (e) maintaining the temperature of said optical cavity within a range over which said output radiation is substantially noise-free.

5. The method of claim 1 wherein said second frequency is twice that of said first frequency.

6. The method of claim 5 which additionally comprises orienting said crystals about said axis so that radiation of a second frequency is generated from all possible polarizations of said radiation of a first frequency which is circulating within the optical cavity.

7. The method of claim 5 wherein said crystals are of the same composition and have a different crystallographic orientation with respect to each other.

8. The method of claim 7 wherein said crystals are comprised of potassium titanyl phosphate.

9. The method of claim 5 wherein said lasant material is selected from the group consisting of neodymium-doped YAG, neodymium-doped YALO, neodymium-doped YLF, neodymium-doped GSGG and neodymium-doped glass.

10. The method of claim 5 wherein said nonlinear optical means consists of two nonlinear optical crystals.

11. The method of claim 1 which additionally comprises:
   (a) measuring the noise in the frequency-doubled output radiation from said laser as a function of the temperature of said optical cavity;
   (b) determining a temperature range for said optical cavity over which said output radiation is substantially noise-free; and
   (c) maintaining the temperature of said optical cavity at a value which is within said determined temperature range during subsequent operation of the laser.

12. The method of claim 4 which additionally comprises:
   (a) measuring the noise in said output radiation as a function of the temperature of said optical cavity;
   (b) determining a temperature range for said optical cavity over which said output radiation is substantially noise-free; and
   (c) maintaining the temperature of said optical cavity at a value which is within said determined temperature range during subsequent production of said output radiation.

13. An apparatus for generating coherent optical radiation which comprises:
   (a) an optical cavity for optical radiation of a first frequency;
   (b) lasant material disposed within said cavity for generating optical radiation of said first frequency; and
   (c) nonlinear optical means for converting said optical radiation of a first frequency into optical radiation of a second frequency wherein said nonlinear optical means comprises at least two nonlinear optical crystals which are positioned within said optical cavity and oriented so that radiation of said first frequency circulating within the optical cavity can interact with said crystals along a phase-match axis of each crystal for said radiation of a first and second frequency.

14. The apparatus of claim 13 wherein the orientation of said crystals about said axis is such that radiation of a second frequency is generated from all possible polarizations of said circulating radiation of a first frequency.

15. The apparatus of claim 13 wherein said crystals are of the same composition.

16. The apparatus of claim 15 wherein said crystals have a different crystallographic orientation with respect to each other.

17. The apparatus of claim 13 which additionally comprises temperature control means for adjusting and controlling the temperature of said optical cavity and its contents.

18. The apparatus of claim 17 wherein said temperature control means is effective to maintain said optical cavity and its contents at a substantially constant temperature.

19. The apparatus of claim 13 wherein said second frequency is twice that of said first frequency.

20. A multilongitudinal mode, optically pumped, solid state laser comprising:
   (a) an optical cavity for optical radiation of a first frequency;
   (b) optical pumping means for generating optical pumping radiation which is selected from the group consisting of laser diodes and light-emitting diodes;
   (c) solid lasant material which is disposed within said cavity, positioned to receive pumping radiation from said optical pumping means, and effective for generating optical radiation of said first frequency upon receiving said pumping radiation; and
   (d) nonlinear optical means for converting said radiation of a first frequency into optical radiation of a second frequency wherein said nonlinear optical means comprises at least two nonlinear optical crystals which are positioned within said optical cavity and oriented so that radiation of said first frequency circulating within the optical cavity can interact with said crystals along a phase-match axis of each crystal for said radiation of a first and second frequency.

21. The laser of claim 20 wherein said second frequency is twice that of said first frequency.

22. The laser of claim 20 wherein the orientation of said crystals about said axis is such that radiation of a second frequency is generated for all possible polarization of said circulating radiation of a first frequency.

23. The layer of claim 20 wherein said crystals are of the same composition.

24. The laser of claim 23 wherein said crystals have a different crystallographic orientation with respect to each other.

25. The laser of claim 23 wherein said crystals are comprised of potassium titanyl phosphate.

26. The laser of claim 20 which additionally comprises temperature of control means for adjusting and controlling the temperature of said optical cavity and its contents.

27. The laser of claim 26 wherein said temperature control means is effective to maintain said optical cavity and its contents at a substantially constant temperature.

28. The laser of claim 20 wherein said lasant material is selected from the group consisting of neodymium-doped YAG, neodymium-doped YALO and neodymium-doped YLF.

29. The laser of claim 20 wherein said nonlinear optical means consists of two nonlinear optical crystals.

30. A method for generating coherent optical radiation which comprises:
  (a) generating optical radiation of a first frequency from a lasant material within an optical cavity for said radiation of a first frequency; and
  (b) converting said optical radiation of a first frequency into optical radiation of a second frequency within said optical cavity with nonlinear optical means comprising at least two nonlinear optical crystals which are oriented so that radiation of said first frequency interacts with said crystals along a phase-match axis of each crystal for said radiation of a first and second frequency.

31. The method of claim 30 wherein said second frequency is twice that of said first frequency.

32. The method of claim 30 which additionally comprises orienting said crystals about said axis so that radiation of a second frequency is generated from all possible polarizations of said radiation of a first frequency which is circulating within the optical cavity.

33. The method of claim 30 which additionally comprises orienting said crystals so that they have a different crystallographic orientation with respect to each other.

34. The method of claim 30 which additionally comprises maintaining the temperature of said optical cavity and its contents at a substantially constant value.

35. The method of claim 34 wherein said temperature is maintained within about ±0.5° C. of the selected value.

36. The method of claim 34 wherein said temperature is maintained within about ±0.1° C. of the selected value.

* * * * *

UNITED STATES PATENT OFFICE
CERTIFICATE OF CORRECTION

Patent No. 4,884,277                    Dated November 28, 1989

Inventor(s) Douglas W. Anthon and Donald L. Sipes, Jr.

It is certified that error appears in the above-identified patent and that said Letters Patent is hereby corrected as shown below:

On the title page:

In the identification of the inventors preceeding the Abstract, "Douglas A. Anthon" should read --Douglas W. Anthon--.

Column 1, line 60, "wellknown" should read --well-known--.

Column 3, line 26, "$n_3\omega_3 = n_1 \cap_1 \pm n_2\omega_2$" should read --$n_3\omega_3 = n_1\omega_1 \pm n_2\omega_2$--.

Column 3, line 26, "$\omega_3 = \omega_1\omega_2$" should read --$\omega_3 = \omega_1 \pm \omega_2$--.

Column 3, line 40, "$|\Delta k| = |k_3-k_1-k_2| < 2\zeta/l$" should read --$|\Delta k| = |k_3-k_1-k_2| < 2\pi/l$--.

Claim 20, line 1, "multilongitudinal mode" should read --multilongitudinal-mode--.

Claim 22, lines 3 & 4, "polarization" should read --polarizations--.

Claim 23, line 1, "layer" should read --laser--.

Signed and Sealed this

Twenty-first Day of May, 1991

*Attest:*

HARRY F. MANBECK, JR.

*Attesting Officer*         *Commissioner of Patents and Trademarks*